US006920826B2

(12) United States Patent
Kienzler et al.

(10) Patent No.: US 6,920,826 B2
(45) Date of Patent: Jul. 26, 2005

(54) ENERGY SUPPLY DEVICE HAVING A SHAFT ROTATABLY SUPPORTED ON A POLYTETRAFLUROETHYLENE BEARING SURFACE

(75) Inventors: Frank Kienzler, Villingen-Schwenningen (DE); Jürgen Voigt, Schramberg (DE); Wolfgang Schillinger, Schiltach (DE); Herbert Höni, Aichhalden-Roethenberg (DE)

(73) Assignee: Junghans Feinwerktechnik GmbH & Co. KG, Schramberg (DE)

( * ) Notice: Subject to any disclaimer, the term of this patent is extended or adjusted under 35 U.S.C. 154(b) by 61 days.

(21) Appl. No.: 10/717,513

(22) Filed: Nov. 21, 2003

(65) Prior Publication Data

US 2005/0011392 A1 Jan. 20, 2005

Related U.S. Application Data

(63) Continuation-in-part of application No. 09/951,633, filed on Sep. 14, 2001, now abandoned.

(30) Foreign Application Priority Data

Sep. 15, 2000 (DE) .......................................... 100 45 684

(51) Int. Cl.[7] .............................................. F42C 15/00
(52) U.S. Cl. ........................ 102/207; 102/221; 102/225
(58) Field of Search .......................... 120/207, 221–225

(56) References Cited

U.S. PATENT DOCUMENTS 3,008,415 A * 11/1961 Foley
3,152,547 A * 10/1964 Kyle
3,563,620 A 2/1971 Weichsel
3,653,325 A 4/1972 Popper
3,678,859 A 7/1972 Wesson et al.
3,680,482 A 8/1972 Hall
3,808,972 A 5/1974 Cammack et al.
3,826,193 A 7/1974 Rognmo et al.
3,876,266 A 4/1975 Rozentals
4,360,749 A 11/1982 Neumann et al.
4,442,578 A 4/1984 White
4,463,275 A 7/1984 Ragaly
4,582,368 A 4/1986 Fujita et al.
4,655,945 A 4/1987 Balsells
4,876,960 A * 10/1989 Schillinger et al.
5,109,171 A 4/1992 Schmider
5,646,076 A 7/1997 Bortz
5,816,372 A 10/1998 Carlson et al.
6,180,574 B1 1/2001 Ryan et al.
6,378,300 B1 4/2002 Johnson et al.
6,463,855 B2 * 10/2002 Zehnder et al. ............. 102/221
6,481,354 B1 11/2002 Heck et al.

* cited by examiner

*Primary Examiner*—Michael J. Carone
*Assistant Examiner*—Lulit Semunegus
(74) *Attorney, Agent, or Firm*—Burns, Doane, Swecker & Mathis, LLP

(57) ABSTRACT

An energy supply device for a mortar fuse includes a housing, a driven rotary shaft including a cylindrical shaft surface rotatably disposed in a stationary cylindrical bearing surface in the housing, and a fan connected to the shaft for rotating the shaft in a single direction of rotation in a speed range of 30,000–50,000 rpm. Either of the cylindrical bearing surface or the cylindrical shaft surface has a destructible coating of polytetrafluoroethylene, the coating having a thickness in the range of 0.02–0.03 mm, and being destructible in response to rotation of the shaft in the speed range for a period of time no longer than 5 minutes.

6 Claims, 2 Drawing Sheets

10
12
14
18
24
16
30
32

10
12
16
24
14
18
26
28
16
24
18

ENERGY SUPPLY DEVICE HAVING A SHAFT ROTATABLY SUPPORTED ON A POLYTETRAFLUROETHYLENE BEARING SURFACE

This application is a Continuation-in-Part of U.S. Ser. No. 09/951,633 filed Sep. 14, 2001 now abandoned, and which claims priority under 35 U.S.C. §§ 119 and/or 365 to patent application Ser. No. 100 45 684.7 filed in Germany on Sep. 15, 2000, the entire content of which is hereby incorporated by reference.

BACKGROUND OF THE INVENTION

The invention relates to an energy supply device which comprises a fan wheel generator for a mortar fuse, e.g., for rotating a component of a mortar fuse, e.g., a detonator-carrying body or a battery charger. The generator includes a shaft which can be driven at high speed by a fan wheel. The shaft is rotatably supported in a housing body of the energy supply device.

In the case of mortar fuses or mortar fuse systems with integrated electrical functions, fan wheel generators are usually employed to provide the supply of energy. The nominal or operating rotary speed of fan wheel generators of that kind is very high, being for example 100,000 rpm. That nominal or operating speed has to be guaranteed during an operating period of the order of magnitude of 3 minutes. Hitherto the fan wheel shaft which rotates at high speed has been supported by high-speed ball bearings. The procurement price of such high-speed ball bearings is very high. Two such high-speed ball bearings are required to support the fan wheel shaft. This means that known energy supply devices of the above-indicated kind involve relatively high production costs.

It is known from U.S. Pat. No. 3,808,972 to make a bearing for an oscillating fan shaft of a bomb completely out of polytetrafluoroethylene (PTFE). However, there occurs the disadvantage that frictional heat is stored or builds up the relatively thick layer of PTFE. Consequently, the PTFE becomes brittle and loses its lubricating function. The shaft will then freeze, i.e., lock-up.

An object of the present invention is to provide an energy supply device of the kind set forth in the opening part of this specification, wherein the shaft is properly lubricated for the expected travel time, without experiencing overheating.

Another object is to provide such a device, the production costs of which are comparatively low, while at the same time resistance to heat is enhanced.

SUMMARY OF THE INVENTION

In accordance with the invention that object is attained by an energy supply device for a mortar fuse comprising a housing, a driven rotary shaft including a cylindrical shaft surface rotatably disposed within a stationary cylindrical bearing surface of the bearing element and a fan connected to the shaft for rotating the shaft in a single direction of rotation in a speed range of 30,000–50,000 rpm (preferably 40,000 rpm). One of the cylindrical bearing surface and the cylindrical shaft surface comprises a destructible coating of polytetrafluoroethylene having a thickness in the range of 0.02–0.03 mm, and being destructible in response to rotation of the shaft in the speed range for a period of time no longer than 5 minutes (preferably 2 minutes).

As a result, during travel of the mortar fuse, frictional heat generated by the shaft will not buildup in the polytetrafluoroethylene coating, but rather will be conducted through the coating to the member on which the coating is disposed, e.g., the housing 16 or the shaft 14. Hence, the PTFE will not become overheated and cause the shaft to freeze-up.

The fact that, in accordance with the invention, the fast-rotating fan wheel shaft and the housing body of the energy supply device (which is in particular a fan wheel generator or for a battery which can be activated by a fan wheel or the like) have a common bearing interface, wherein the bearing surface of the shaft or the bearing surface of the housing is provided with a PTFE coating, provides a self-lubricating bearing arrangement for the shaft in the housing. That bearing arrangement replaces the known high-speed ball bearings, thus resulting in enhanced mechanical durability and strength and a higher level of resistance to heat of the energy supply device according to the invention.

In accordance with the invention the housing can advantageously comprise a suitable metallic or plastic material. A major advantage lies in the great reduction in cost. The concept of the invention can be used for example in relation to simple AZ-mortar fuses with dual circuitry closure in accordance with MIL-STD 1316. The invention can also be employed in relation to mortar time fuses, mortar proximity fuses, multifunction mortar fuses and so forth.

In accordance with the invention the PTFE coating can be provided on a plain bearing insert of the housing or on an injection moulding of the housing.

BRIEF DESCRIPTION OF THE DRAWINGS

Further details, features and advantages are apparent from the description hereinafter of two embodiments of the energy supply device according to the invention, of which embodiments are shown in the drawing in which.

DETAILED DESCRIPTION OF PREFERRED EMBODIMENTS OF THE INVENTION

Figure 1:
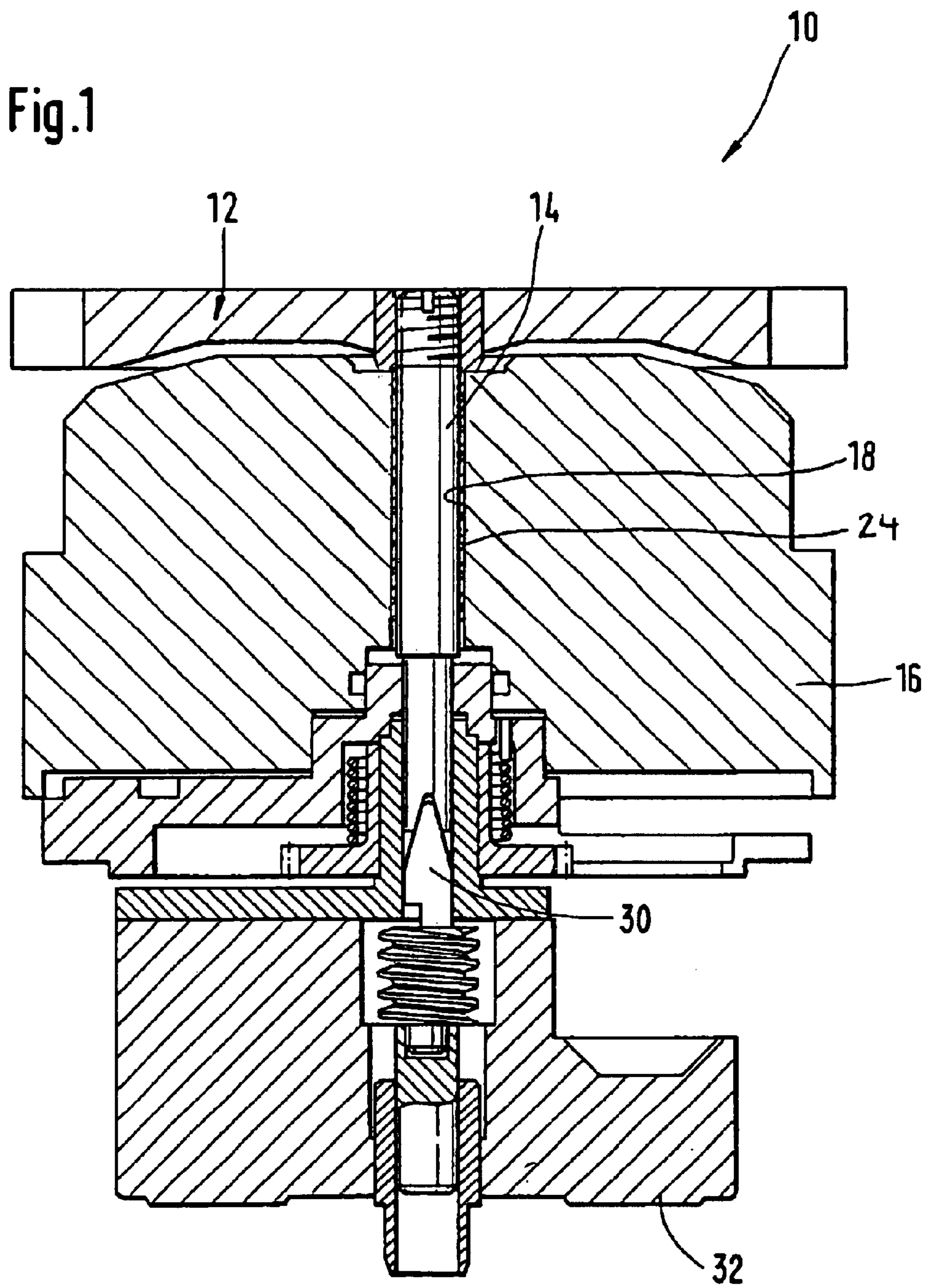
FIG. 1 is a view in longitudinal section showing a portion of a first embodiment of the energy supply device in the form of a fan wheel generator for a mortar fuse and, FIG. 2 is a view in longitudinal section similar to FIG. 1 showing a portion of a second embodiment of the energy supply device in the form of a battery which can be activated by a fan wheel.

FIG. 1 shows an energy supply device 10 having a fan wheel 12 which is fixedly connected to a metallic shaft 14 (e.g., steel). The apparatus can be of the type disclosed in U.S. application Ser. No. 09/754,208, filed Jan. 5, 2001, the disclosure of which is incorporated by reference herein. The shaft 14 drives a worm 30 which, in turn, rotates a body 32 that carries a detonator (not shown).

The shaft 14 is supported in a hole 18 of a housing body 16 of the energy supply device 10. The wall of the hole 18 is provided with a coating 24 of PTFE (preferably Teflon® or a Teflon® admixture) which forms a PTFE bearing surface for the shaft 14. The PTFE bearing surface is adapted with a sliding fit tolerance to a corresponding bearing surface of the shaft 14.

The PTFE coating 24 provides a self-lubricating bearing arrangement for the fan wheel shaft 14 which rotates at high speed during active operation.

Once the mortar has been fired, the shaft is expected to rotate in a single direction at a speed in the range of 30,000–50,000 rpm, preferably 40,000 rpm.

The coating 24 of polytetrafluoroethylene is applied in a thickness of only 0.02–0.03 mm (the thickness shown as greatly exaggerated in the figures) so that frictional heat generated therein will be rapidly conducted to the housing 16 and dissipated. Hence, the PTFE will not overheat and cause the shaft to freeze-up. The coating thickness is sized to endure (barely) for the expected travel time of the mortar, e.g., no longer than 5 minutes, preferably no longer than 2 minutes. Thereafter, the coating 24 will have been destroyed by friction.

Instead of being disposed on the wall of the hole 18, the PTFE coating 24 could be provided on a separate insert disposed in the housing, or it could be provided on the bearing surface of the metallic shaft 14. In the latter case, heat generated in the coating can be quickly conducted to the shaft for effective dissipation.

Figure 2:
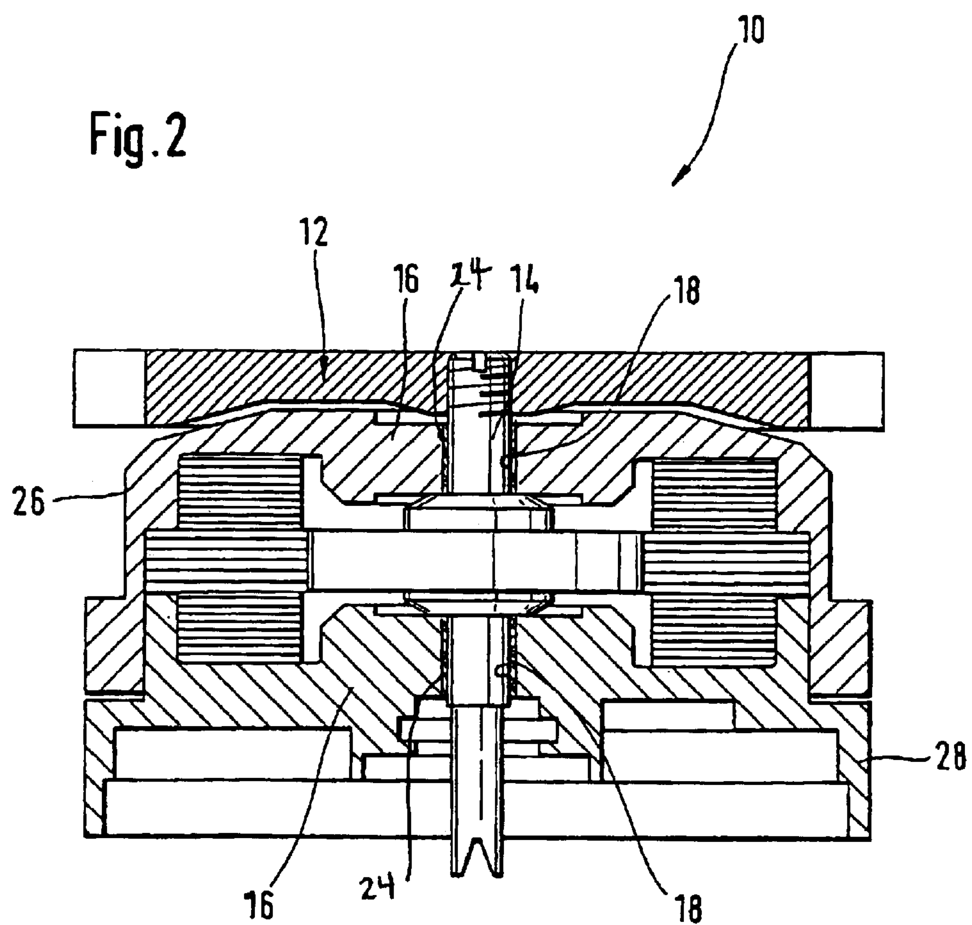

FIG. 2 shows a portion of an embodiment of the energy supply device 10 comprising a fan wheel 12 which is fixedly connected to a shaft 14. The fan wheel shaft 14 is rotatably supported in a housing body 16 that forms a battery operated by the driven shaft. The housing body 16 has two housing portions 26 and 28 which are fitted one into the other and each of which is provided with a through-hole 18. The two through holes 18 of the housing portions 26 and 28 are adapted with a sliding fit tolerance to the two-part shaft 14 of the fan wheel 12, while there is a PTFE coating 24 disposed on the shaft or on the wall of the through-hole 18, or on a separate insert disposed in the housing.

The housing body can advantageously comprise a suitable metallic or plastic material. A major advantage lies in the great reduction in cost. The concept of the invention can be used for example in relation to simple AX-mortar fuses with dual circuitry closure in accordance with MIL-STD 1316. The invention can also be employed in relation to mortar time fuses, mortar proximity fuses, multi-function mortar fuses and so forth.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. An energy supply device for a mortar comprising:

a housing;

a driven rotary shaft including a cylindrical shaft surface rotatably disposed within a stationary cylindrical bearing surface in the housing; and a fan connected to the shaft for rotating the shaft in a single direction of rotation in a speed range of 30,000–50,000 rpm;

one of the cylindrical bearing surface and the cylindrical shaft surface comprising a destructible coating of polytetrafluoroethylene having a thickness in the range of 0.02–0.03 mm, and being destructible in response to rotation of the shaft in the speed range for a period of time no longer than 5 minutes.

2. The energy supply device according to claim 1 wherein the period of time is no longer than 2 minutes.

3. The energy supply device according to claim 1 wherein the coating is on the stationary bearing surface.

4. A mortar fuse comprising:

a housing;

a body mounted in the housing for rotation and carrying a detonator;

a driven rotary shaft including a cylindrical shaft surface rotatably disposed within a stationary cylindrical bearing surface in the housing; and a fan connected to the shaft for rotating the shaft in a single direction of rotation in a speed range of 30,000–50,000 rpm;

one of the cylindrical bearing surface and the cylindrical shaft surface comprising a destructible coating of polytetrafluoroethylene having a thickness in the range of 0.02–0.03 mm, and being destructible in response to rotation of the shaft in the speed range for a period of time no longer than 5 minutes.

5. The mortar fuse device according to claim 4 wherein the period of time is no longer than 2 minutes.

6. The mortar fuse device according to claim 4 wherein the coating is on the stationary bearing surface.

* * * * *